March 20, 1928. 1,663,528
A. TACCHELLA
BEARING
Filed May 2, 1921
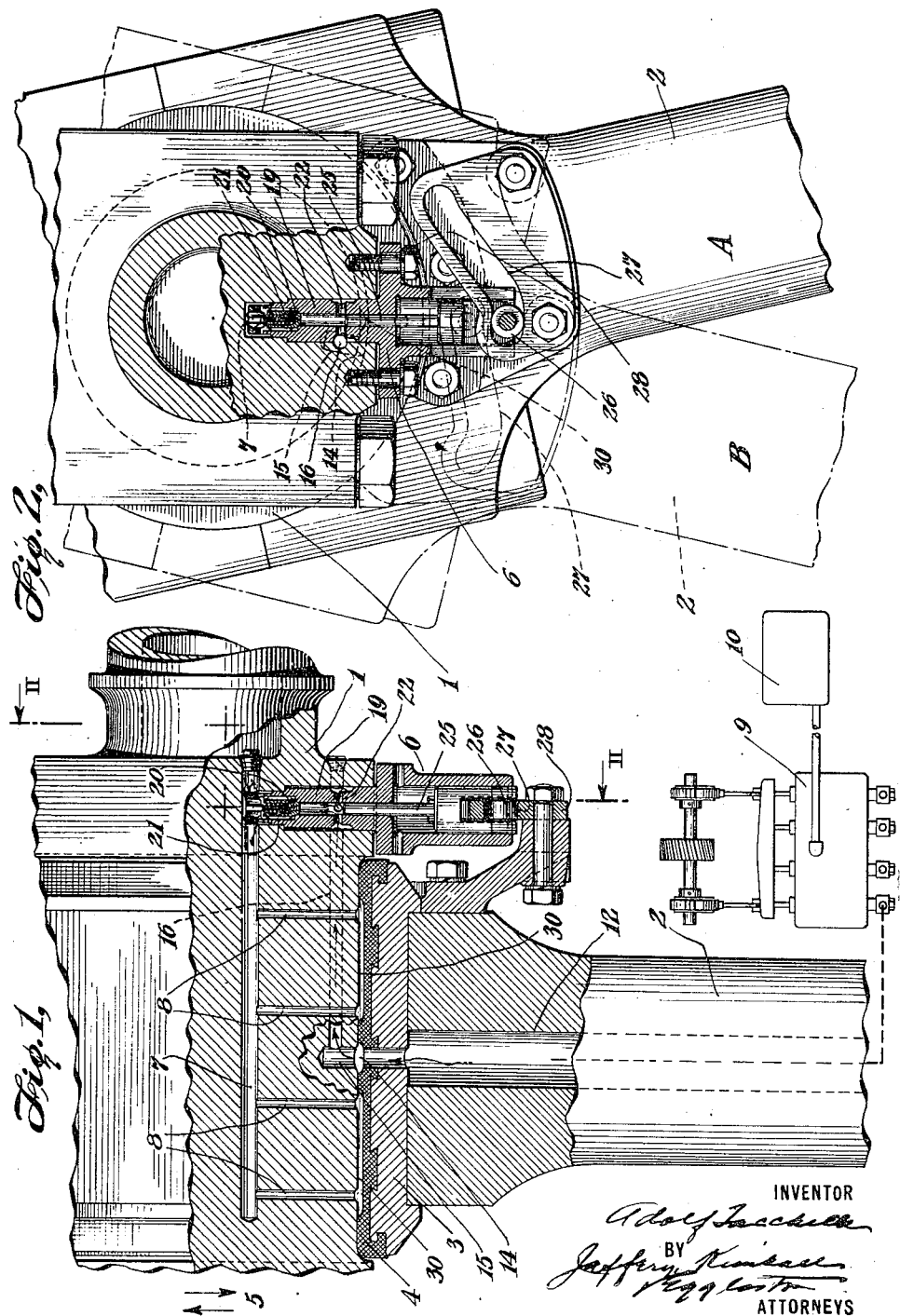
INVENTOR
Adolf Tacchella
BY
Jaffery Kimball
Eggleston
ATTORNEYS Patented Mar. 20, 1928.

1,663,528

UNITED STATES PATENT OFFICE.

ADOLF TACCHELLA, OF ST. LOUIS, MISSOURI, ASSIGNOR TO BUSCH-SULZER BROS.-DIESEL ENGINE CO., OF ST. LOUIS, MISSOURI, A CORPORATION OF MISSOURI.

BEARING.

Application filed May 2, 1921. Serial No. 465,975.

The invention relates to machine bearings generally, with special reference to those bearings in which both the journal and the brasses are moving parts and to such as are subject to high or abruptly applied pressures like the bearings of internal combustion engines and especially the piston and cross-head pin bearings thereof. It has for its objects, among others, to furnish the lubricant to the bearings in a certain and effective manner and maintain an oil film on the pressure side of the bearing, that is to say in the narrow crevice or space where the pressure between the bearing members tends to squeeze the lubricant out of position. To these ends it comprehends a lubricant forcing means that is local to the bearing it serves and which is preferably operated by the immediately associated parts of the bearing, and also concerns the design of a pump type forcing means and a particular mode of operating such pump as later described, as well as other matters hereinafter appearing. It may be noted that certainty of adequate lubricant supply to the point of greatest pressure and the delivery of the lubricant thereto during the existence of the high pressure condition, are not readily obtained by the forced oil systems heretofore employed.

The accompanying drawings show the invention applied to the bearing of a cross-head pin of a Diesel engine. Fig. 1 is a sectional elevation of the bearing with the lubricant source shown diagrammatically and Fig. 2 is an elevation of the bearing partly in section.

In the drawing, the cross-head pin is marked 1 and the connecting rod 2; the customary bearing box in the end of the connecting rod contains the brasses 4 forming the bearing surfaces for the pin. The cross-head pin, it will be understood, is carried by a cross-head that reciprocates in guides in the direction of the arrows 5 of Fig. 1 while the engine is in motion; the guides are not shown in the drawings. The connecting rod 2 connects the cross-head to the engine crank shaft and swings or oscillates on the cross-head pin between the positions A and B of Fig. 2 as it turns the shaft. The local forcing means 6 for forcing lubricant into the cross-head pin bearing is applied to one of the bearing members, the pin in the instance illustrated, and delivers its lubricant to the pressure side of the bearing surfaces through the main and branch passages 7 and 8 bored in the pin as shown. The lubricant forcing means may assume various forms according to the conditions encountered and it may take its lubricant from any suitable source. It is here shown as a small reciprocating pump taking lubricant from the usual oil system represented in the present case by the customary lubricating pump 9 which supplies other bearings of the engine as well, and which in turn receives lubricant from the engine sump 10 or other source and delivers or forces it through the passage 12 bored in the connecting rod and the bearing box to a circumferential channel 14 in the brass 4 and from thence through the registering passages 15 and 16 in the pin to the inlet ports 22 of the local forcing means. The channel 14 maintains a connection between the passages 12 and 15 in all angular positions of the connecting rod and the connection between the supply pump 9 and the passage 12 may be assumed to be by way of passages through the crank shaft and crank shaft bearings in accordance with the common practice in the forced oil lubrication of engines. The cylinder 19 of the pump is preferably set into one end of the cross-head pin so that the outlet valve 20 may be disposed in or at the end of the delivery ducts 7 and 8 bored in the bearing member and as close to the bearing surfaces as possible. The valve may be of any suitable type and is shown seated by a spring 21. The inlet ports 22 of the pump 6 are formed in the side wall thereof in registry with the supply duct 16 and where they are uncovered by the plunger 25 toward the end of its filling stroke. The plunger of the pump is driven by the turning movement of the connecting rod on the pin and for this purpose is provided with a roller 26 occupying a cam slot 27 in an operating plate 28 fastened by a bracket to the connecting rod so that the oscillation of the connecting rod from its position A to its opposite position B on the other side of the cross-head moves the plunger through a full stroke in one direction (shown as discharging) and the return of the connecting rod similarly retracts the plunger. The slot 27, while inclined for nearly the whole of its length for this purpose, is formed to give no plunger movement near one end so that as the plunger reaches the lowermost position, that is to say, below the inlet ports 22, a dwell is produced long enough to permit the entering oil to fill the cylinder under the delivery of the distributing or common pump 9. It will now be apparent that each complete stroke of the engine piston is accompanied by a similar complete stroke of the pump 6 and the lubricant is positively delivered into the bearing under adequately high pressures to enable it to enter the crevice on the pressure side of the bearing as shown, and form a lubricating oil film therein. This effect, it will be observed, is accomplished by the direct and immediate application of the pump 6 to the crevice it serves and may be quite independent of the pressure of the oil at the distributing pump 9 and the pressure at which it is delivered to the local forcing means. Equivalent positive oil delivery cannot be practically secured with existing force feed systems, especially in the case of oscillating bearings like those of connecting rods wherein the bearings do not continuously rotate in the same direction, because of the high pressures required and the inevitable leakage and loss of pressure where numerous bearings are served by the main pump in succession or where the oil under high pressure is required to pass through other forms of movable joints in its passage to the bearing. The lubricant delivery, it will be further observed, may be contemporaneous even with a part of the working stroke of the engine, that is to say, while the load on the bearing is at its maximum thereby assuring a supply of lubricant during the period when the lubricant is most needed. Whether the delivery is during the first or last part of the working stroke depends in the device shown on the direction in which the engine is running, and the operating plate 28 may be variously formed to prolong or reduce the period of delivery during the working stroke as desired, as will be apparent, or to cause the lubricant delivery to occur during some other part of the engine cycle, or to produce other than a single full pump stroke with each engine stroke though I prefer to employ the working relation shown since thereby oil is delivered to the bearing on every application of pressure or at least between every two applications of maximum pressure. Oil grooves 30 in the surfaces of the brasses 4 distribute the oil over the whole bearing surface and also serve as reservoirs to supply the bearing while the pump is making its filling stroke. The pump body shown is prolonged to form a guide for the enlarged head and roller 26 of the pump plunger, the guide part being slotted to accommodate the cam plate as shown, but it will be apparent that various styles and designs of pumps may be employed within the principle of this invention. In the present case the pump is bolted to the bearing by its flanges as shown in the drawing.

It may now be observed that the invention may be applied to any bearing and that the particular kind of lubricant is not material to its principle although the invention is herein shown as applied to a well known oiling system; nor is it of special consequence whether the said oiling system, in so far as it furnishes oil to the local pump 6, be of the forced feed or any other type, since by appropriate modification the local forcing means may be designed to draw its lubricant from any convenient source, but when used in conjunction with a forced feed pump as 9 each local forcing means acts as a booster in respect to the delivery of oil to the surfaces it serves. It will be noted, too, that the presence of the pump valve 20 close to the bearing serves to confine the oil in the bearing against possible backward flow under the effect of intermittently applied pressures on the bearing, in this respect acting as a check valve as well as the outlet valve of the pump, and regardless of where the lubricant pump may be located I prefer to employ such a check valve for this purpose at a point in the oil passage where the communication between it and the bearing may be short and formed entirely within the body of one of the bearing members as shown rather than by external pipes. The shape of the cam slot in the operating plate is dependent on the nature of the movement of the one member of the bearing with respect to the other and may be changed as desired as before pointed out, or other forms of operating means may be substituted for that shown or indeed the forcing means may be operated otherwise than by the adjacent bearing member, but this mode of operation embodies the invention in a simple and compact form and conveniently adapts it to bearings in which both members of the bearing are movable as illustrated. Altogether the invention as shown is subject to various modifications both as to its manner of application and to its use without departing from its principles as appears from the following claims.

I claim:

1. Lubricating means for a bearing comprising a source of lubricant, a lubricant pump mounted on a moving member of said bearing and therewith moving with respect to said lubricant source, means providing a lubricant passageway continuously connecting said source to the pump, said means including a moving joint to accommodate the movement of the pump with respect to the source, and means for operating the pump to deliver lubricant to the bearing.

2. The combination with a moving connecting rod having a bearing at one end and a bearing at its other end, of a pump to supply lubricant to the second mentioned bearing, said pump being located adjacent the second mentioned bearing and moving with the connecting rod, a remote source of lubricant supply, and a connection from said source to the intake of the pump, said connection including a passage pierced in the connecting rod and a passage in the first mentioned bearing leading to said passage pierced in the connecting rod.

3. The combination with a bearing, one of the members of which is pierced with a lubricant passageway leading to the bearing surfaces, of a reciprocating lubricant-forcing pump, the element of said pump which contains the outlet opening of the pump being fixed to said member of the bearing which contains the said lubricant passageway and the said pump-outlet opening directly into said pierced lubricant passageway without the interposition of a pipe outside said member of the bearing, means for reciprocating the movable pumping element of the pump, and a source of lubricant connected to the intake of the pump.

4. The combination with a bearing, one of the members of which is pierced with a lubricant passageway leading to the bearing surfaces, of a reciprocating lubricant-forcing pump, the element of said pump which contains the outlet opening of the pump being fixed to said member of the bearing which contains the said lubricant passageway and the said pump-outlet opening directly into said pierced lubricant passageway, means for reciprocating the movable pumping element of the pump, and a source of lubricant connected to the intake of the pump, characterized by the fact that there is a pressure-operated valve interposed between the bearing surfaces and the pump chamber and closing toward the pump chamber.

5. The combination with a pin-and-connecting-rod bearing, of a reciprocating lubricant pump therefor having its cylinder member mounted on the pin and opening to a passage therein leading to the bearing surfaces, and having its plunger connected to the connecting rod for operation thereby as said rod swings on the pin, said connecting rod being provided with a passage for supplying lubricant to the pump.

6. The combination with a bearing and lubricant pump therefor, of a locally applied lubricant forcing means for said bearing comprising a cylinder having outlet and inlet ports displaced from each other axially of the cylinder, the inlet port being open to said remote lubricant pump, a plunger in the cylinder the path of travel of which crosses said inlet port, a check valve for the outlet of the forcing means closing toward the same, and means for operating the plunger.

7. The combination with a machine having a plurality of bearings, one of the members of each of which is pierced with a lubricant supplying passage leading to the working surfaces of its bearing, of a local lubricant pump for each of said bearings for continually pumping lubricant through its bearing and under pressure while the machine is in operation, the outlet port of each pump being located immediately at the receiving end of the said pierced passage.

8. The combination with a machine bearing wherein one member of the bearing turns on the other, of a lubricant supplying passage therefor having its outlet end arranged to deliver lubricant into the bearing crevice on the side of the bearing where the maximum pressure between the bearing members exists, and a local lubricant pump placed close to the bearing for continually forcing lubricant into the bearing through said passage while the machine is in operation.

9. The combination with a machine having a plurality of bearings wherein one member of each bearing turns on the other, of a lubricant supplying passage for each of said bearings, each passage having its outlet end arranged to deliver lubricant into the bearing crevice on the side of its bearing where the maximum pressure between the bearing members is exerted, a local lubricant pump for each of said bearings, each pump being placed close to its bearing and delivering through said passage, and means for operating the pumps arranged to cause each pump to deliver lubricant into its bearing crevice while the said maximum pressure of its bearing is being exerted.

In testimony whereof, I have signed this specification.

ADOLF TACCHELLA.